United States Patent
Kan et al.

(10) Patent No.: US 11,983,184 B2
(45) Date of Patent: May 14, 2024

(54) MULTI-TENANT, METADATA-DRIVEN RECOMMENDATION SYSTEM

(71) Applicant: Salesforce, Inc., San Francisco, CA (US)

(72) Inventors: Kin Fai Kan, Sunnyvale, CA (US);
Chaney Lin, San Francisco, CA (US);
Mayukh Bhaowal, Belmont, CA (US);
Shubha Nabar, Sunnyvale, CA (US);
Seiji J. Yamamoto, Oakland, CA (US)

(73) Assignee: Salesforce, Inc., San Francisco, CA (US)

(*) Notice: Subject to any disclaimer, the term of this patent is extended or adjusted under 35 U.S.C. 154(b) by 0 days.

(21) Appl. No.: 17/496,615

(22) Filed: Oct. 7, 2021

(65) Prior Publication Data
US 2023/0110057 A1    Apr. 13, 2023

(51) Int. Cl.
*G06F 16/2457*    (2019.01)
*G06F 16/25*    (2019.01)
*G06F 18/214*    (2023.01)
*G06N 20/00*    (2019.01)

(52) U.S. Cl.
CPC ...... *G06F 16/24578* (2019.01); *G06F 16/258* (2019.01); *G06F 18/214* (2023.01); *G06N 20/00* (2019.01)

(58) Field of Classification Search
CPC . G06F 16/24578; G06F 16/258; G06N 20/00; G06K 9/6256
USPC ........................................................ 707/723
See application file for complete search history.

(56) References Cited

U.S. PATENT DOCUMENTS

| | | | |
|---|---|---|---|
| 7,730,478 B2 | 6/2010 | Weissman | |
| 10,778,628 B2* | 9/2020 | Brechbuhl | G06F 16/248 |
| 10,984,283 B2 | 4/2021 | Aerni et al. | |
| 2005/0216292 A1* | 9/2005 | Ashlock | G06Q 30/0278 |
| | | | 705/306 |
| 2008/0250312 A1* | 10/2008 | Curtis | G06Q 10/00 |
| | | | 715/700 |
| 2015/0379576 A1* | 12/2015 | Otis | H04W 4/021 |
| | | | 705/14.58 |
| 2016/0019217 A1* | 1/2016 | Reblitz-Richardson | |
| | | | G06F 16/435 |
| | | | 707/731 |
| 2017/0140262 A1* | 5/2017 | Wilson | H04L 67/125 |
| 2017/0220603 A1* | 8/2017 | Riggs | G06F 16/2458 |
| 2018/0096267 A1 | 4/2018 | Masekera et al. | |

(Continued)

OTHER PUBLICATIONS

Abdollahpouri, et al., "Managing Popularity Bias in Recommender Systems with Personalized Re-ranking," ACM, FLAIRS '19, May 18-22, 2019, Sarasota, Florida, USA, 6 pages.

(Continued)

*Primary Examiner* — Hosain T Alam
*Assistant Examiner* — Saba Ahmed
(74) *Attorney, Agent, or Firm* — Holland & Hart LLP

(57) ABSTRACT

A method for generating a model for recommendations from an item data set for a target data set includes embedding a set of targets from the target data set in a shared coordinate space using a first embedding function, embedding a first set of items from the item data set in the shared coordinate space using a second embedding function, selecting at least one target from the set of targets, and identifying a second set of items from the first set of items that are proximate to the at least one target as candidates from the recommendations.

12 Claims, 13 Drawing Sheets

(56) References Cited

U.S. PATENT DOCUMENTS

| | | | | |
|---|---|---|---|---|
| 2018/0157759 | A1* | 6/2018 | Zheng | G06F 16/9038 |
| 2019/0138946 | A1* | 5/2019 | Asher | G06N 5/02 |
| 2019/0179962 | A1* | 6/2019 | Khan | G06F 16/24578 |
| 2019/0370231 | A1* | 12/2019 | Riggs | G06Q 40/06 |
| 2020/0057958 | A1 | 2/2020 | Moore et al. | |
| 2020/0057959 | A1 | 2/2020 | Moore et al. | |
| 2020/0193245 | A1* | 6/2020 | Divakaran | G06N 3/08 |
| 2020/0250587 | A1 | 8/2020 | Aerni et al. | |
| 2020/0372090 | A1* | 11/2020 | Markman | G06F 16/9535 |
| 2020/0372561 | A1 | 11/2020 | Sanghavi et al. | |
| 2021/0049419 | A1 | 2/2021 | Bhaowal et al. | |
| 2021/0110306 | A1* | 4/2021 | Krishnan | G06N 3/08 |
| 2021/0406761 | A1* | 12/2021 | Yang | G06Q 30/0251 |
| 2022/0129804 | A1* | 4/2022 | Dooley | G06Q 10/0635 |

OTHER PUBLICATIONS

Amazon Web Serivces, Inc., "overview," Amazon Personalize, 2021, downloaded from https://aws.amazon.com/personalize/ Sep. 30, 2021, 19 pages.

Amazon Web Serivces, Inc., "Step 4: Evaluating a solution version with metrics," Amazon Personalize, Developer Guide, https://docs.aws.amazon.com/personalize/latest/dg/working-with-training-metrics.html, pp. 143-145.

Apache Incubator, "Ranking Problems," Ranking Measures, Hivemall User Manual, downloaded from https://hivemall.incubator.apache.org/userguide/eval/rank.html# on Sep. 30, 2021, 1 page.

Chen, et al., "Ranking Measures and Loss Functions in Learning to Rank," Jan. 2009, Advances in Neural Information Processing Systems 22: 23rd Annual Conference on Neural Information Processing Systems 2009, Dec. 7-10, 2009, Vancouver, BC, Canada, 9 pages.

Ge, et al., "Beyond Accuracy: Evaluating Recommender Systems by Coverage and Serendipity," ACM 2010, RecSys'10, Sept. 26-30, 2010, Barcelona, Spain, pp. 257-260.

Github, Inc., "blacyin / competitive-recsys," 2021, downloaded from https://github.com/blancyin/competitive-recsys Sep. 30, 2021, 6 pages.

Github, Inc., "statisticianinstilettos / recmetrics," 2021, downloaded from https://github.com/statisticianinstilettos/recmetrics Sep. 30, 2021, 11 pages.

He, et al., "Neural Collaborative Filtering*," ACM, WWW 2017, Apr. 3-7, 2017, Perth, Australia, 10 pages.

Herlocker, et al., "Evaluating Collaborative Filtering Recommender Systems," ACM Transactions on Information Systems, vol. 22, No. 1, Jan. 2004, pp. 5-53.

Jugovac, et al., "StreamingRec: A Framework for Benchmarking Stream-based News Recommenders," ACM 2018, RecSys '18, Oct. 2-7, 2018, Vancouver, BC, Canada, 5 pages.

Kluver, et al., "Evaluating Recommender Behavior For New Users," ACM, RecSys'14, Oct. 6-10, 2014, Foster City, Silicon Valley, CA, USA, 8 pages.

Krishnan, et al., "Social Influence Bias in Recommender Systems: A Methodology for Learning, Analyzing, and Mitigating Bias in Ratings," ACM 2014, RecSys'14, Oct. 6-10, 2014, Foster City, Silicon Valley, CA, USA, 8 pages.

Said, et al., "Comparative Recommender System Evaluation: Benchmarking Recommendation Frameworks," ACM 2014, RecSys'14, Oct. 6-10, 2014, Foster City, Silicon Valley, CA, USA, 8 pages.

Salakhutdinov, et al., "Restricted Boltzmann Machines for Collaborating Filtering," Proceedings of the 24th International Conference on Machine Learning, Corvallis, OR, 2007, 8 pages.

salesforce.com, Inc. "Einstein Recommendations," Help, docs, Marketing Cloud Data Management and Analytics, downloaded from https://help.salesforce.com/articleView?id=sf.mc_pb_personalization_builder.htm&type=5 Jul. 30, 2021, 2 pages.

salesforce.com, Inc., "Salesforce Release Notes," Salesforce, Winter '21, Last Updated Mar. 18, 2021, 656 pages.

Sawtelle, "Mean Average Precision (MAP) for Recommender Systems," Oct. 25, 2016, downloaded from http://sdsawtelle.github.io/blog/output/mean-average-precision-MAP-for-recommender-systems.html on Sep. 30, 2021, 13 pages.

Shani, et al., "Evaluating Recommendation Systems," 2011, downloaded from https://www.bgu.ac.il/~shanigu/Publications/EvaluationMetrics.17.pdf on Sep. 30, 2021, 43 pages.

Tondulkar, et al., "Get Me the Best: Predicting Best Answerers in Community Question Answering Sites," ACM 2018, RecSys '18, Oct. 2-7, 2018, Vancouver, BC, Canada, pp. 251-259.

Valcarce, et al., "On the Robustness and Discriminative Power of Information Retrieval Metrics for Top-N Recommendation," ACM 2018, RecSys '18, Oct. 2-7, 2018, Vancouver, BC, Canada, 9 pages.

Yang, et al., "Unbiased Offline Recommender Evaluation for Missing-Not-at-Random Implicit Feedback," ACM 2018, RecSys '18, Oct. 2-7, 2018, Vancouver, BC, Canada, pp. 279-287.

Yao, et al., "Judging Similarity: A User-Centric Study of Related Item Recommendations," ACM 2018, RecSys '18, Oct. 2-7, 2018, Vancouver, BC, Canada, pp. 288-296.

Yi, et al., "Beyond Clicks: Dwell Time for Personalization," ACM 2014, RecSys'14, Oct. 6-10, 2014, Foster City, Silicon Valley, CA, USA, 8 pages.

Zhong, et al., "A Field Study of Related Video Recommendations: Newest, Most Similar, or Most Relevant?" ACM 2018, RecSys '18, Oct. 2-7, 2018, Vancouver, BC, Canada, pp. 274-278.

Zhu, et al., "Benchmarks," deepCTR, 2018, AnyAI Revision ff176a50, downloaded from https://deepctr.readthedocs.io/en/latest/benchmark.html on Sep. 30, 2021, 4 pages.

* cited by examiner

MULTI-TENANT, METADATA-DRIVEN RECOMMENDATION SYSTEM

TECHNICAL FIELD

One or more implementations relate to the field of automated machine-learning recommendations; and more specifically, to a process for generating a recommendation model for machine-learning.

BACKGROUND ART

Machine learning is a type of artificial intelligence that involves algorithms that build a model based on sample data. This sample data is referred to as training data. The trained models can generate predictions, a process also referred to as scoring, based on new data that is evaluated by or input into the model. In this way, machine learning models can be developed for use in many applications without having to be explicitly programmed for these uses.

Recommendation systems are a set of software functions that analyze user input or data to identify information that could be relevant to the user. Recommendation systems can be utilized for online shopping interfaces, streaming content selection interfaces, and similar applications. The recommendation systems can use machine learning models to analyze input data about a user or provided by the user to identify the recommendations. However, these recommendation systems are tailored to a particular schema (i.e., organization of user data) and use case. A recommendation system for online shopping cannot be applied to other use cases such as streaming content selection. Thus, there is significant effort and manpower that is devoted to developing a recommendation system for each use case.

BRIEF DESCRIPTION OF THE DRAWINGS

The following figures use like reference numbers to refer to like elements. Although the following figures depict various example implementations, alternative implementations are within the spirit and scope of the appended claims. In the drawings:

DETAILED DESCRIPTION

The following description describes implementations for an automated process for generating recommendation models. The embodiments provide a platform solution with a general-purpose engine that can apply to any schema or use case. The embodiments enable a generation of a recommendation model for any type of target recipient (e.g., users, applicants, work orders) and any type of item that can be recommended to the recipient (e.g., parts, job listings). The general-purpose engine can produce a recommendation system that recommends, for any target, what are the most relevant items.

Embodiments use metadata to automatically determine how to convert raw data into a numerical representation. The retrieval and ranking stages of the recommendation system do not assume anything about the input schema.

Thus, the embodiments provide a system for recommending items (e.g., products) to targets (e.g., customers). The recommendation system can utilize past interactions between items and targets to generate the recommendation model where these interactions can be purchases, views, likes, or similar, or similar interactions. A further example embodiment can include recommending events (i.e., items) to event participants (i.e., targets). Past interactions in this example could be events participants have attended in the past. In another example, the recommending of movies (i.e., items) to subscribers (i.e., targets). Past interactions can be viewed movies, ratings, or similar tracked activities. Interactions can be any activities that are categorized as positive/negative pairs of targets, items, used when training a model.

Figure 1:
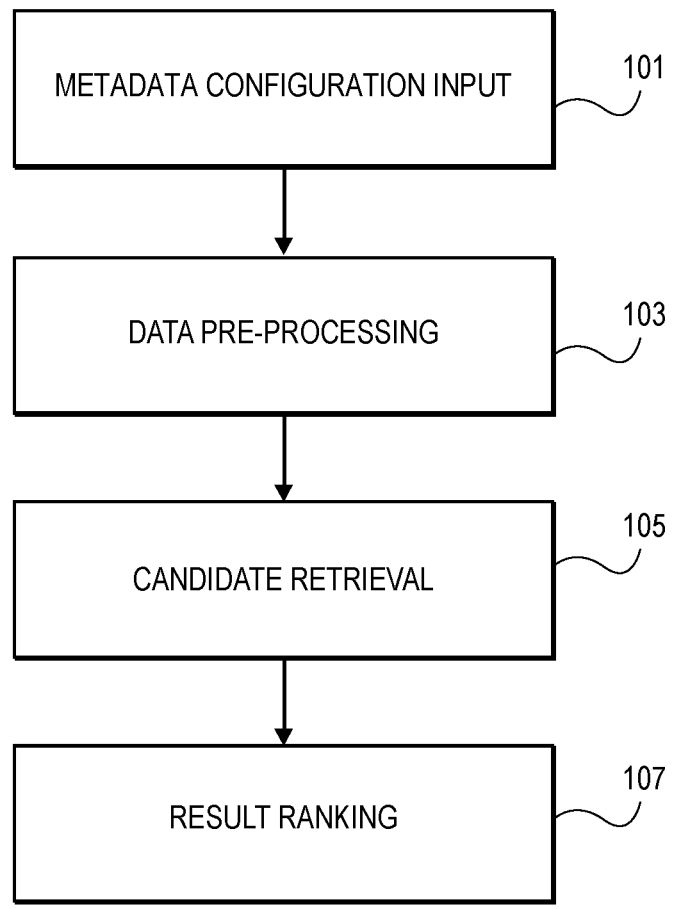
FIG. 1 is a flowchart of one embodiment of a process for a recommendation model generation process.

FIG. 1 is a diagram of one embodiment of the recommendation model generation system. The process can be initiated with receiving configuration for the modeling logic (Block 101). A user (e.g., an administrator) specifies a meta-data configuration. The configuration can include indicating table(s) to use for each user, item, interaction, and other information that specifies their use case and data model. The further steps of the process use the metadata configuration information in a workflow that is generic and runs for all use cases. The further process can involve data pre-processing (Block 103), candidate retrieval (Block 105), and result ranking (Block 107). The data pre-processing stage (Block 103) prepares target and item data for the modeling process. The target and item data are embedded into a shared coordinate space. The shared coordinate space can be utilized to identify candidate items for a given target as part of the candidate retrieval stage (Block 105). Any number of different candidate identification processes can be used in conjunction with the embedding of the data into the shared coordinate space. The resulting set of candidates, referred to as a candidate pool, can be scored for relevance in the result ranking stage (Block 107). Any scoring algorithm or process can be utilized for the scoring. Based on the scoring, the candidate items are ranked, and the highest ranking items returned as recommendations. Where the resulting recommendations meet a threshold quality level, the recommendation model can be published for usage.

Further examples and details of these stages are described herein in relation to FIGS. 2-9.

Figure 2:
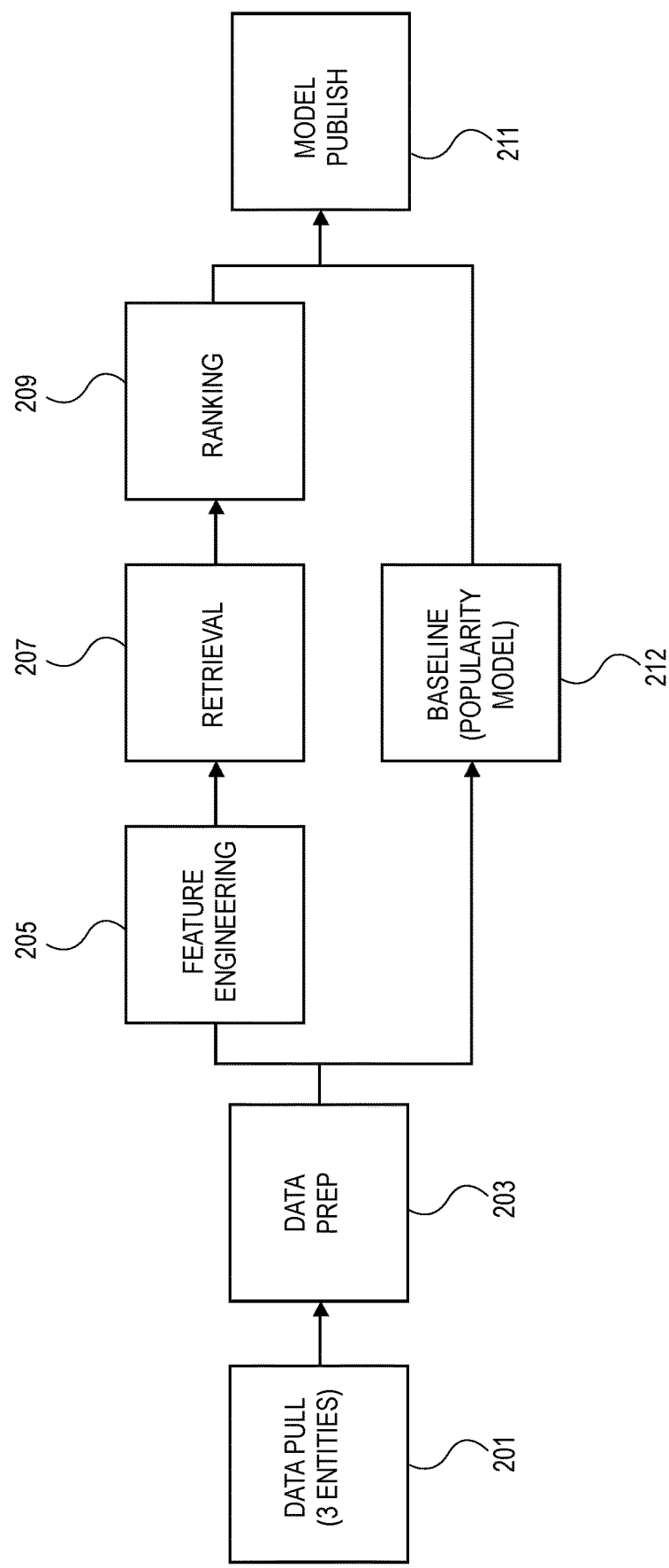
FIG. 2 is a diagram of one embodiment of a system for generating recommendation models.

FIG. 2 is a diagram of one embodiment of a system for generating recommendation models. The system can include further components including a data pull 201, data preparation 203, feature engineering 205, retrieval 207, ranking 209, model publish, and baseline stages 213. The data pull stage 201 retrieves data from an application, database, or similar source. The data pull can identify and retrieve any data that is relevant to generation of a recommendation model. A user that is designing a recommendation model can identify the data to be included as either a target or an item and the data pull stage can retrieve this data as identified. In some embodiments, a user that is designing the recommendation model configures what data/tables from tenant data to use for targets, items, and interactions. Metadata is associated with the tables (e.g., whether a table is a Target table) as well as the data types of table columns to be used when training the recommendation model.

Figure 3:
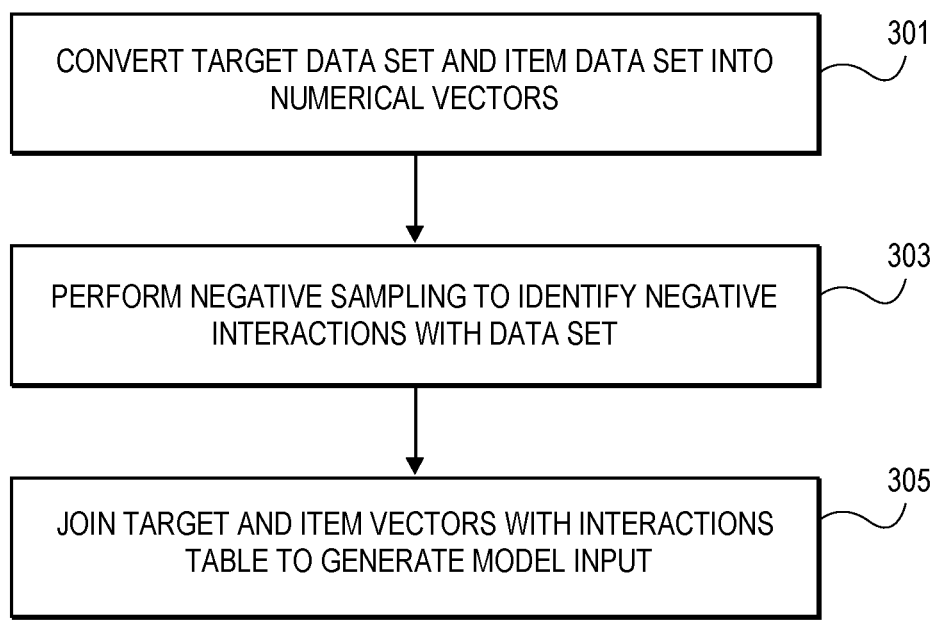
FIG. 3 is a flowchart of one embodiment of a process for data pre-processing for generating a recommendation model.

The retrieved data can be prepared in the data prep stage 203 and organized in the feature engineering stage 205. The process of the data prep stage 203 and feature engineering stages are discussed with relation to FIGS. 3 and 4. FIG. 3 is a flowchart of one embodiment of an example of the data pre-processing method. The data pre-processing stage prepares the data retrieved during the data pull stage 201 for use in the retrieval stage 207 by a retrieval model. The data pre-processing stage 203 can convert the target data set and the item data sets into numerical vectors (Block 301). When generating a recommendation model, the item and target data are collected from the data of the tenant in a system such as in multi-tenant systems. The item and target data can be identified from meta-data of the data of the tenant in the system. The collected or pulled item and target data can be converted into a vector format.

Figure 4:
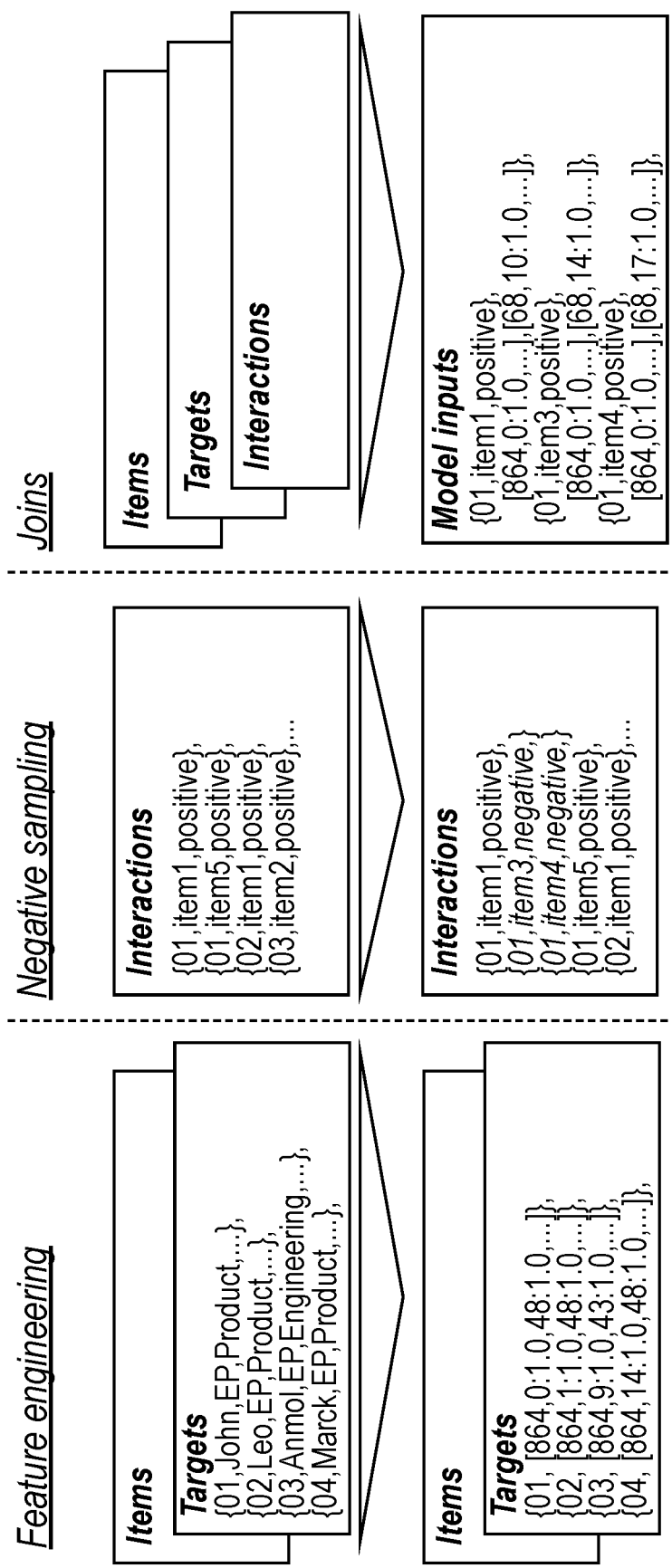
FIG. 4 is a diagram of one embodiment of a data pre-processing example.

FIG. 4 is a diagram of one example of the data conversion. The vectors are shown in sparse format. The vectors have a format of [Size, Position:Value, . . . ]. Size is the size of the vector (i.e., the number of position value pairs). Any range of numbers can be used to identify positions and values. The non-zero values in the target and item data sets are specified in the resulting vector by position:value. Example: [1, 2, 0, 0] would be specified as [4, 0:1, 1:2] if using 0-indexing.

To convert the raw fields (john, EP, etc.) in the examples to numerical values, the data pre-processing performs some transformations for each type of data in the sets. The transformation of the target, item and interactions data sets can be performed by a feature engineering model or similar component. The feature engineering model or similar feature engineering process transforms and normalizes the item data set and target data set. Feature engineering in the data pre-processing and vectorization of the target and item data sets can further include data validation. In some embodiments open source machine learning libraries (e.g., TransmogrifAI) can be utilized for data validation stages (e.g., fill-rate checks from raw feature filter and the min variance filter) and automated type-driven feature engineering. In further embodiments, additional feature engineering can include aggregating past interactions, converting categorical features into numerical features (frequency of occurrence in positive interactions), pre-trained document embeddings (e.g., BERT), using actual vocabulary as a corpus versus hashed vocabulary (for text features), and auto-detection of postal codes with latitude-longitude conversion.

Returning to FIG. 3, the data pre-processing continues with performing negative sampling to identify negative interactions with the data set (Block 303). The identification of negative interactions can be specified by the designing user or inferred by the engineering model. The interactions dataset (i.e., a set of all possible interactions) is generally very sparsely labeled and contains only data on positive interactions that are tracked in a system (e.g., likes or viewings). Therefore, the process treats some unlabeled interactions as negative samples (i.e., "negative sampling"). The process can sample uniformly from the unlabeled interactions and treat them as negative samples. In some embodiments, the process optionally uses interactions with the most popular items as negative samples (if not explicitly positive). In further embodiments, the process can utilize more intelligent negative sampling techniques (e.g., creating a separate model to identify which unlabeled samples are most dissimilar from explicit positives). FIG. 4 illustrates an example of negative sampling where two data entries are created and labeled as negative interactions from the range of possible items or targets that are not explicitly identified as positive interactions (e.g., item3 and item4).

Returning again to FIG. 3, the data pre-processing continues with a stage of joining target vectors, item vectors, and interactions to generate a set of training data to be utilized for the recommendation model (Block 305). The join operations can combine items, targets, and interactions as combined entries in the training data set. The join operations can also be used in multiple stages of the modeling workflow including in filtering, feature engineering, negative sampling, and as discussed herein to combine any combination of these entities.

Referencing the overall process of FIG. 2, after the data pre-processing a data set can also be sent to be processed by an existing 'baseline' model (e.g., a popularity model) stage 213. This can be a basic normalized and/or vectorized set of target, item, interactions data or subsets thereof. The more specific feature engineering stage 205 is specific to the recommendation model being generated. The baseline stage 213 provides a point of comparison to evaluate the recommendation model that is generated where a recommendation model that exceeds the quality of the baseline can be published (i.e., deployed or made available for use).

Figure 5:
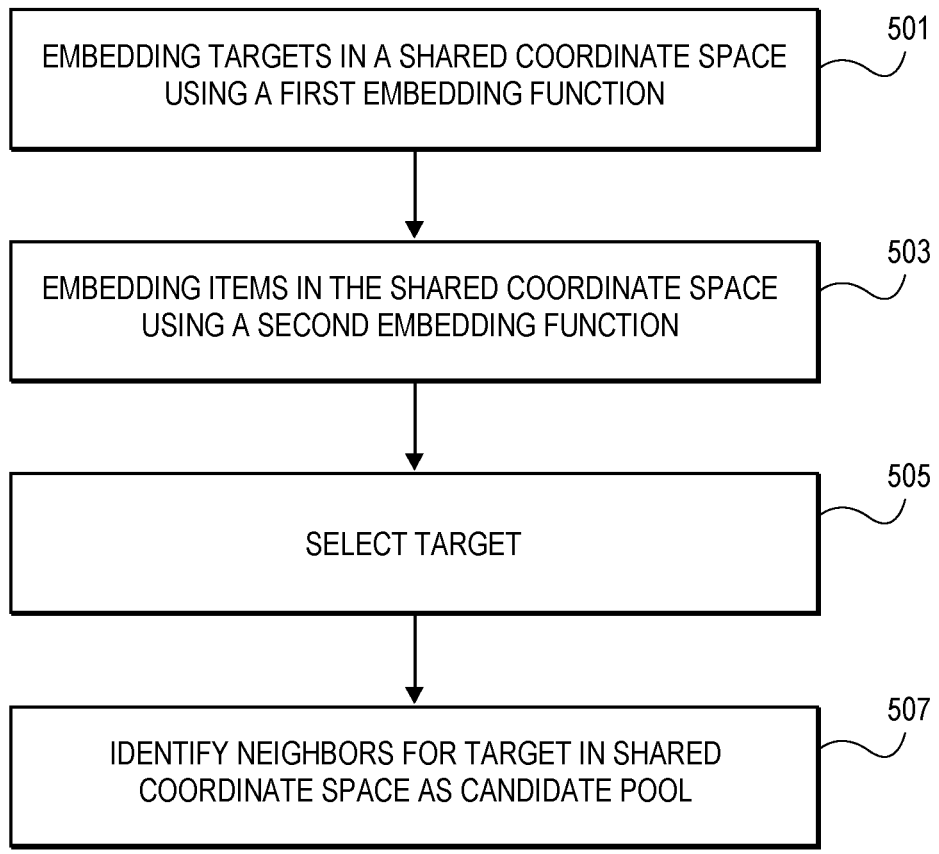
FIG. 5 is a flowchart of one embodiment of a process for recommendation candidate retrieval.

After the completion of the feature engineering stage 205, the retrieval stage 207 can process the feature engineered data set. FIG. 5 is a diagram of one embodiment of a candidate retrieval process. The retrieval process can embed the items and targets into a shared coordinate space. In the example of FIG. 5, the target data is embedded in the shared coordinate spaces using a first embedding function (Block 501). The embedding functions operate to reduce the vector space dimension and support a distance metric between vectors such that target vectors and item vectors that are predicted to have a higher likelihood of interacting are closer in the shared coordinate space.

The items from the input data set can similarly be embedded in the shared coordinate space using a second embedding function (Block 503). The first and second embedding functions can be the same or different. Any function capable of transforming the items or targets into the shared coordinate space such that the distance between the targets and items indicates a higher likelihood of interaction can be utilized. The embedding functions can be implemented as a neural network trained using standard loss functions and optimizers.

Figure 6:
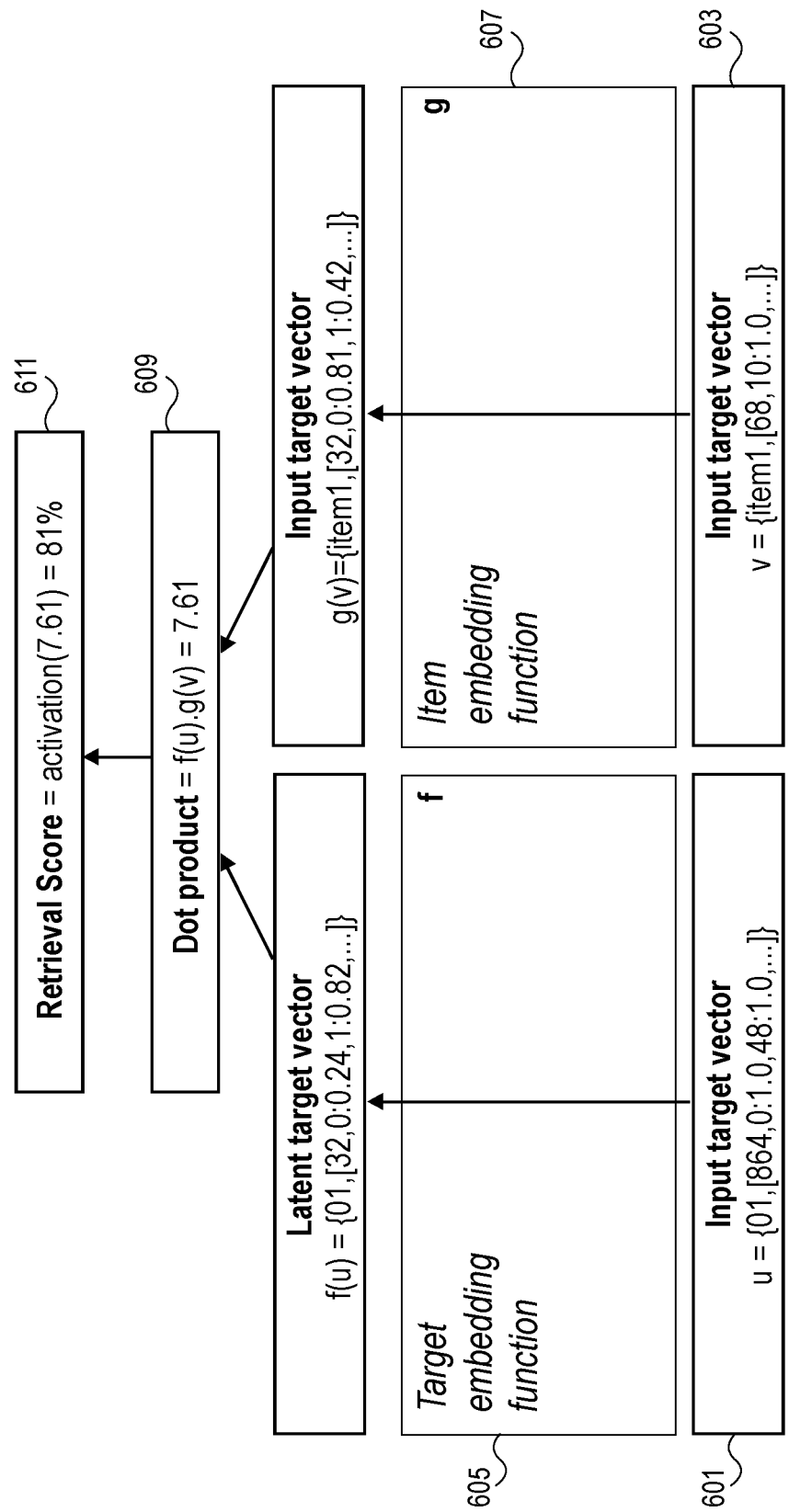
FIG. 6 is a flowchart of one embodiment of a process for composition of parametrized functions that can be used for candidate retrieval.

FIG. 6 is a flowchart of one embodiment of the process of an embedding process. The embedding process receives a set of input target vectors (u) (Block 601) and a set of input item vectors (v) (Block 603). A parameterized (embedding) function f is applied to the next target vector (Block 605).

Similarly, a parameterized (embedding) function g is applied to the next item vector (Block 607). The dot product of the functions f, g is calculated (Block 609), a linear transformation and exponential transformation are applied to this value. This is the final retrieval score (Block 611), and the retrieval score falls within [0,1]. In some embodiments, a loss is computed between the final score and the known label and an optimizer is executed that repeats this over a set of examples of (target, item, label) and updates the parameters in order to reduce the expected loss. The embedding process is iteratively repeated for each input vector until a specified stopping condition is met (e.g., repeat N times).

Returning to FIG. 5, after the embedding functions complete and the shared coordinate space is populated, then a target can be selected (Block 505) and neighbors of the selected target in the shared coordinate space can be selected and designated as a candidate pool (Block 507). The neighbors can be identified using any nearest neighbor algorithm or process to identify the closest set of items to a selected target. Any number of items can be selected and in some cases items of different characteristics can be selected for the candidate pool or to create multiple candidate pools. The candidate pool generated by the candidate retrieval can be combined or utilized in conjunction with other candidate pools created using other existing candidate retrieval processes.

Figure 7:
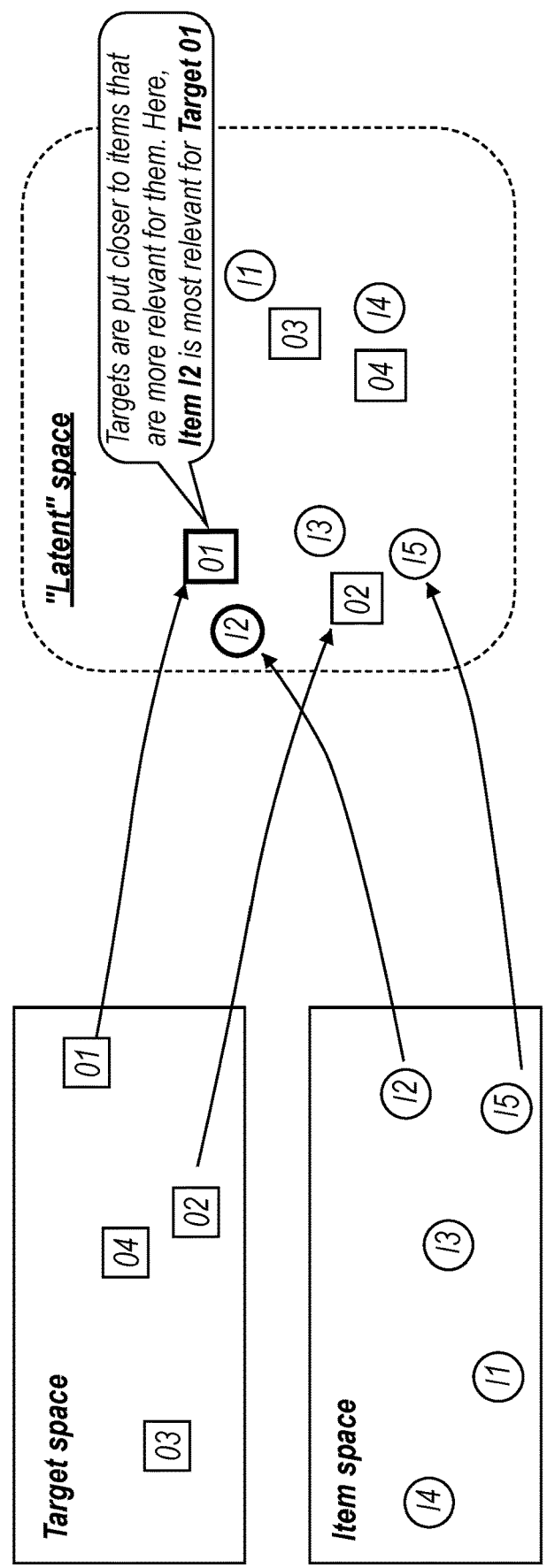
FIG. 7 is a diagram of one embodiment of an example embedding of an item data set and a target data set into a shared coordinate space.

FIG. 7 is a diagram of an example of the embedding process. In this example, the shared coordinate space is referred to as a 'latent space.' In the example there are a set of four targets that have an inherent target space. Similarly, there are a set of 5 items that have an inherent item space. The latent space is a mapping of the target space and items space onto a shared coordinate space or latent space where proximity between targets and items in the shared coordinate space indicates that the items are more relevant to the respective targets.

The embedding process provides numerous benefits. The benefits include fast retrieval of relevant items. In the shared coordinate space or latent space, distance between targets and items is a relevance measure. The problem of retrieving relevant items is a nearest-neighbors problem. There are fast nearest-neighbor algorithms that index the items for efficient querying that can be used for identifying relevant items. Another benefit is that there are solutions for cold starts (i.e., new targets/items with no interaction history). The embedding process can inherently handle a cold-start target and immediately recommend items as long as there is target metadata. The new target can be embedded into the existing shared coordinate space. The embedding can similarly handle the cold-start item and begin recommending the item to targets and just need to update the index. The new item can be embedded in the existing shared coordinate space with the updated indexing. A further benefit is the re-usability of the recommendation model for other recommendation problems. For example, four problems at once can be solved with the same embedding functions f, g: (1) given target, retrieve relevant items; (2) given item, retrieve relevant targets; (3) given target, retrieve similar targets; and (4) given item, retrieve similar items.

Figure 8:
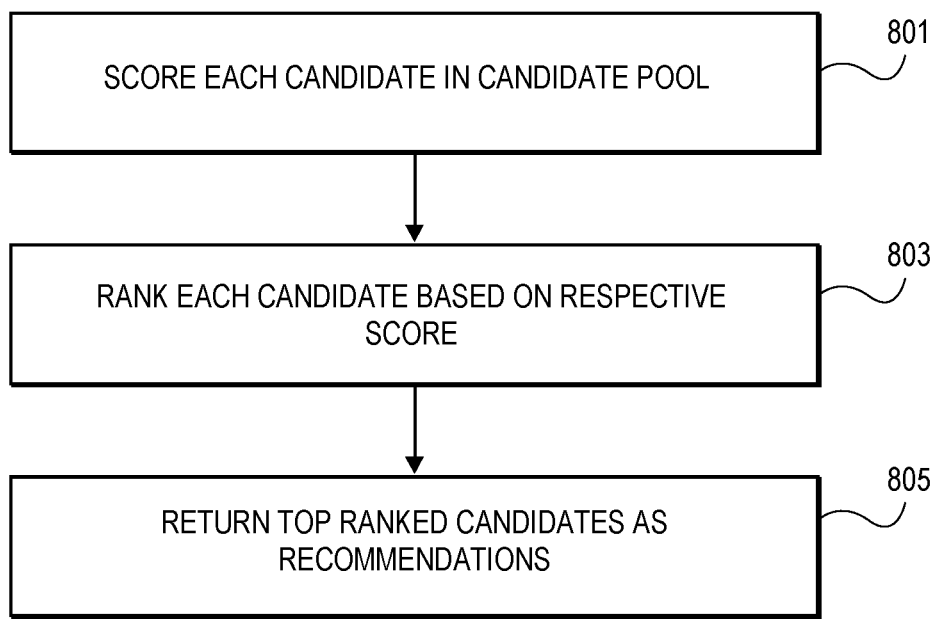
FIG. 8 is a flowchart of one embodiment of a process of ranking a set of candidate recommendations.

Referencing again FIG. 2, the candidate retrieval stage 207 is followed by the ranking stage 209. Both the retrieval stage 207 and the ranking stage 209 can be implemented by respective retrieval models and ranking models. The ranking stage 209 can receive a pool of candidates or multiple pools or sets of candidates from the candidate retrieval stage 207. FIG. 8 is a flow chart of one embodiment of a ranking process. The ranking process can include scoring each received candidate in the candidate pool (Block 801). Any scoring algorithm can be utilized for the scoring. The designing user can select the scoring algorithm, or the scoring algorithm can be a fixed scoring algorithm. In some embodiments, a scoring algorithm can be selected automatically based on the type of items or targets. Each scored candidate can then be ranked or ordered according to the scoring (e.g., high to low or low to high) (Block 803) and the highest or lowest ranking items of a set number can be returned as the suggestions, thereby completing the formation of the recommendation model (Block 805). As shown in FIG. 2, the resulting recommendation model and the top recommendations and similar aspects can be compared against a baseline 213 to determine whether the recommendation model provides proper performance and is to be published 211.

Figure 9:
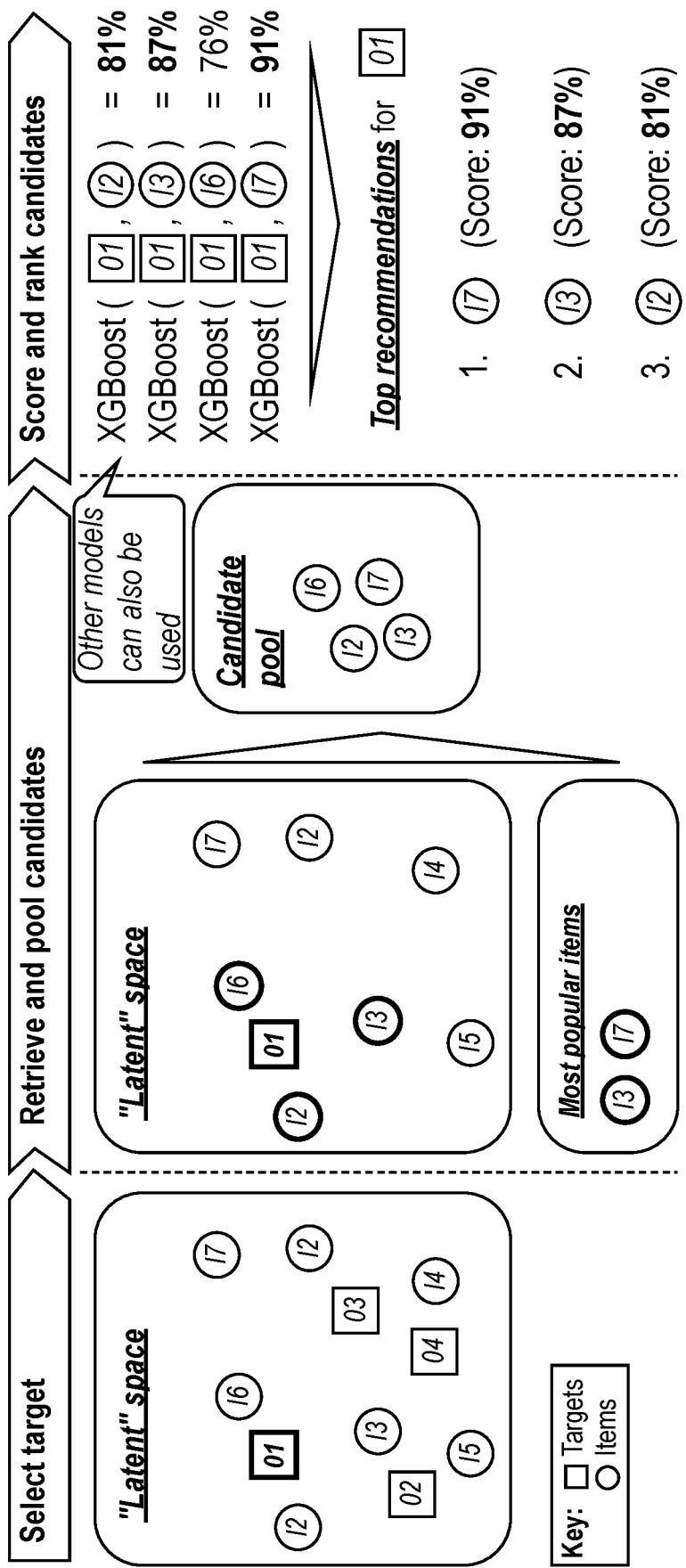
FIG. 9 is a diagram of one embodiment of the target selection, candidate retrieval, scoring, and ranking stages of the process.

FIG. 9 is a diagram of one example embodiment of the retrieval and ranking processes. In the illustrated example, the process from the target selection to the recommendation ranking is illustrated. In the illustrated example, a target [01] is selected from a set of targets that have been embedded in the shared coordinate space, in the 'select target' phase.' In the 'retrieve and pool candidates' phase of the illustration, the three nearest neighbors that are items (I2), (I3), and (I6) are identified and designated as candidates. These candidates can be placed in a pool of candidates along with other candidates that can be selected using other candidate identification processes. In the illustrated example, a 'most popular items' process is also employed that identifies items (I3) and (I7). As a result, the candidate pool is expanded with the inclusion of (I7).

In the next phase 'score and rank candidates,' a scoring algorithm or component (e.g., the XGBoost algorithm) scores each of the selected candidates for the given selected target. The resulting scores can then be utilized to rank the recommendations based on the scores from the highest score to the lowest score. In the illustrated example, the top three scored items are returned as recommendations (e.g., items (I7), (I3), and (I2)). Other scoring algorithms and ranking mechanisms can be utilized. The illustration is provided by way of example and not limitations.

Figure 10:
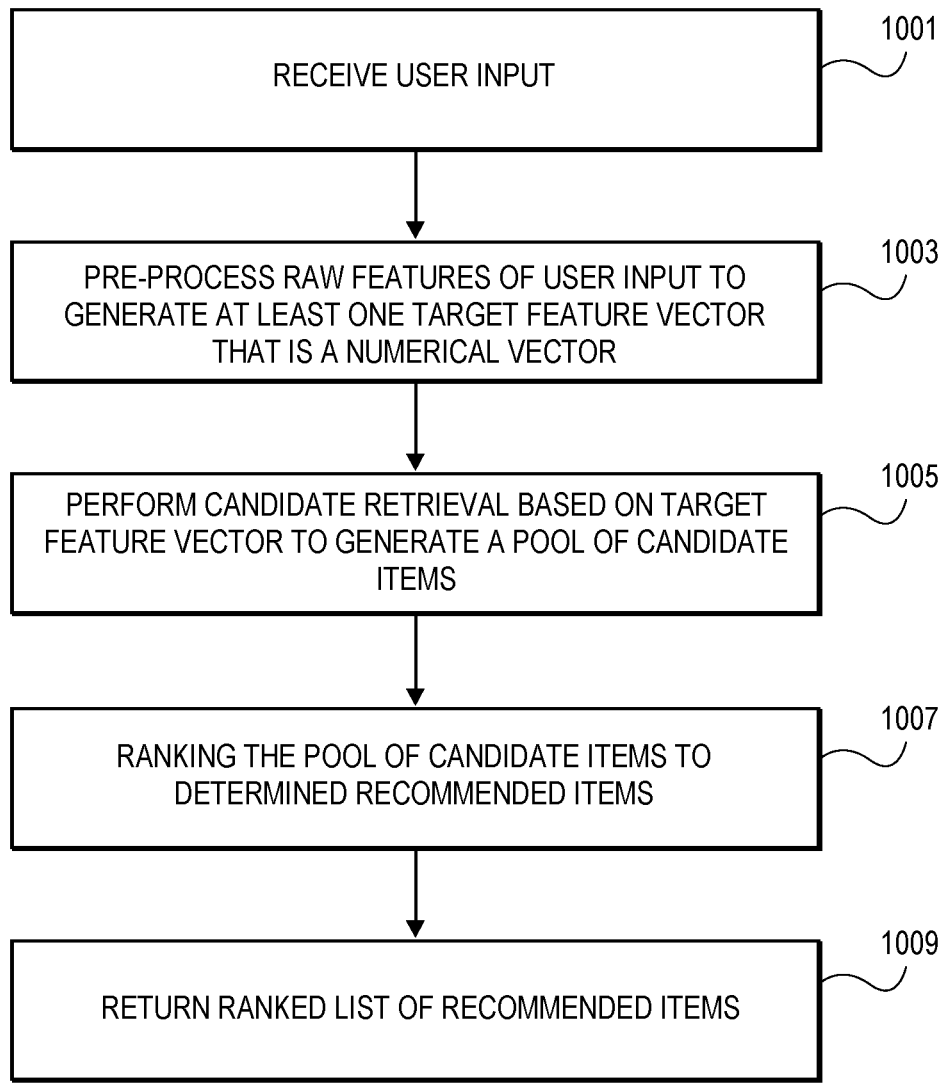
FIG. 10 is a diagram of one example embodiment of an architecture for providing a recommendation service that utilizes the recommendation models generated by the embodiments.

FIG. 10 is a diagram of one embodiment of a process of a recommendation model during operation. The recommendation model once configured and trained can service requests for recommendations. The recommendation serving flow is shown in the illustrated flowchart. In this example, the serving recommendation model can receive a set of input data from a user or user system/software (block 1001). The user input can include target raw features, past interactions, and similar data. In some embodiments, a set of items can also be included as input (e.g., identifiers of the items or items represented with raw features). The received input can be pre-processed (block 1003). Pre-processing of the raw input data (e.g., features) can include a conversion to numerical vectors that are expected as input for retrieval and ranking models. The numerical vectors can include/represent item vectors and target vectors.

The retrieval models perform candidate identification based on the input target feature vector that identifies the selected target as well on the shared coordinate space with the embedded items to produce a set of candidate items (Block 1005). The ranking model receives the set of candidate items from the retrieval model or a set of retrieval models or other sources of candidates and performs a ranking of the candidates (Block 1007). The ranking model can receive the target feature vector, candidate items, and similar inputs and provide a ranked list of recommended items that is returned to the requestor (Block 1009).

Figure 11:
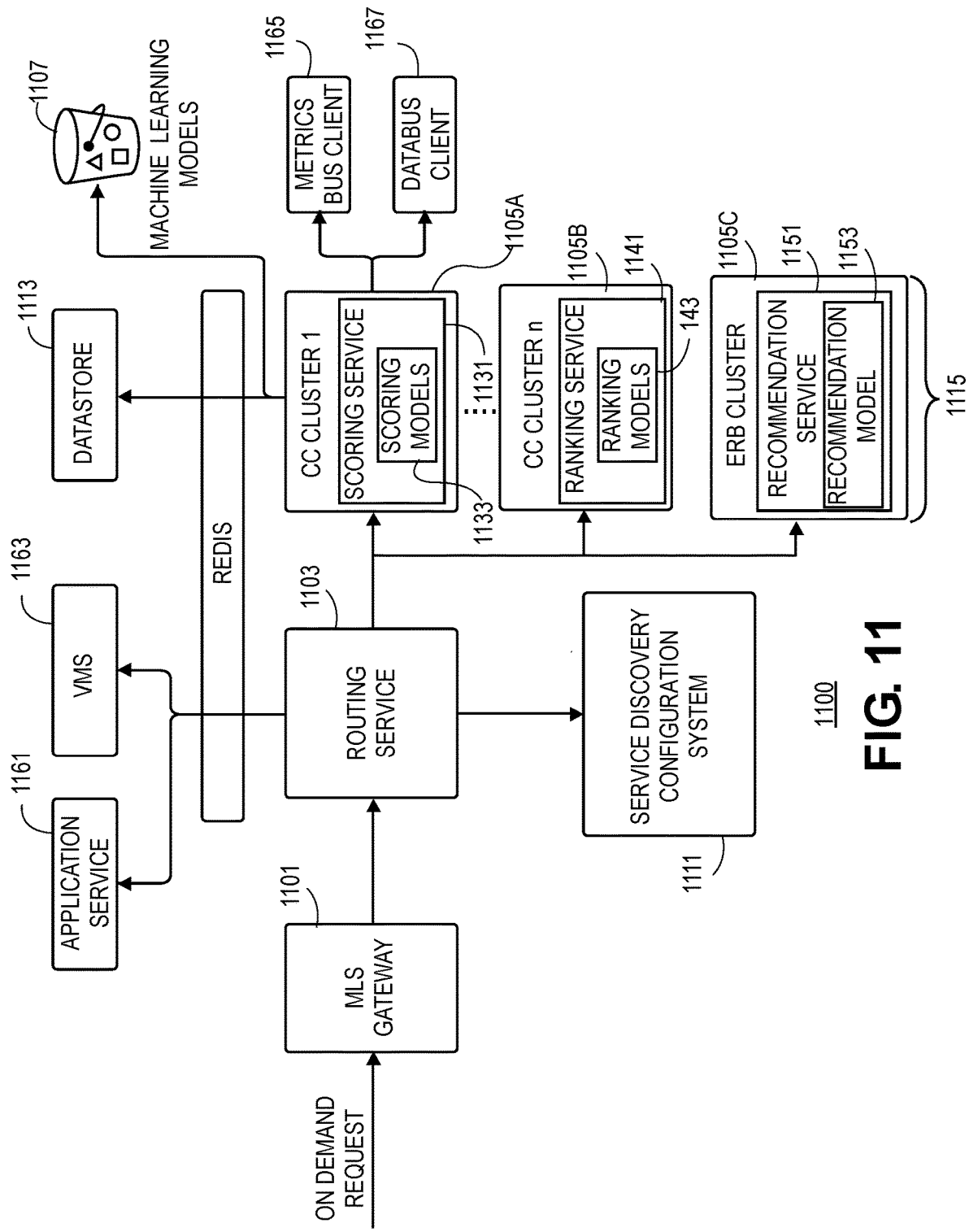
FIG. 11 is a diagram of one embodiment of an infrastructure for executing the recommendation system including the recommendation models.

FIG. 11 is a diagram of one embodiment of an infrastructure for executing the recommendation system including the recommendation models. In this example machine learning (ML) serving infrastructure a set of models are utilized in support of applications that make requests of the ML serving infrastructure. ML models are executed or supported by nodes (i.e., serving containers) within the ML serving infrastructure. This ML serving infrastructure is provided by way of example and not limitation. Those skilled in the art would appreciate that the generated recommendation models described herein can be executed on other equivalent infrastructures.

The nodes are hosted by a cluster in the ML serving infrastructure where each cluster implements a particular ML framework. There are a wide variety of variety of ML frameworks or libraries (e.g., TransmogrifAI/SparkML Lib, TensorFlow, XGBoost), APIs (HTTP/gRPC, Java interface), programming languages (Java, Python), and related technologies that can be employed in any combination in an ML serving infrastructure. There can be multiple groups that are creating ML models that will be deployed in the same ML serving infrastructure such as in the case where the ML serving infrastructure supports multi-tenancy. The ML models can have different requirements, use cases, and needs. Hence there can be multiple ways to integrate ML models and serve them.

As used herein, an application can be any program or software to perform a set of tasks or operations. A machine-learning (ML) model can be a set of algorithms and statistical data structures that can be trained to perform a specific task by identifying patterns and employing inference instead of using explicit instructions. The ML model can be trained for the task using a set of training data.

A machine-learning (ML) serving infrastructure can be automated and organized to support multi-tenancy where containers can be used to execute the ML models that can service the applications and users of tenants in a multitenant system. Within a multitenant system, a software application is designed to provide each tenant with a tenant-specific view of the application including access only to tenant-specific data, configuration, user management, and similar tenant properties and functionality. A tenant can be a group of users who are part of a common organization or share common access privileges to the multi-tenant system and the associated software applications.

The machine-learning serving infrastructure 1100 includes a machine-learning service (MLS) gateway 1101, routing service 1103, routing manager 1175, service discovery and configuration system 1111, set of serving containers 1115, and data stores, along with other supporting infrastructure.

A serving container 1115 (i.e., a 'node') can be an isolated execution environment that is enabled by an underlying operating system, and which executes the main functionality of a program such as an ML model. A serving container 1115 can host any number of ML models for any number of tenants. Serving containers 1115 can be organized as a cluster. The cluster can be a group of similar entities, such that a cluster of serving containers can be a group of serving container instances or similar grouping. An ML serving infrastructure 1100 can host any number of serving containers 1115 or clusters of serving containers. Different clusters can host different versions or types of ML models.

In some example implementations, a cluster of serving containers 1115 can host all ML models of the same version for all tenants. This organization of the cluster can be limited by the number of ML models that a single-serving container can hold. The ML serving infrastructure 1100 can scale to accommodate further additions of ML models even in cases where the number or variety of ML models exceed the capacity of the serving containers 115 in the cluster. Since each ML model's size, which can range from hundreds of kilobytes (KB) to hundreds of megabytes (MB), initialization time, and the number of requests that are serviced, can vary widely based on each tenant's underlying database and usage, some clusters of serving containers 1115 may have a high resource usage, while other clusters of serving containers 1115 may have a low resource utilization. The resource usage, failure, or addition of any server container in a cluster of serving containers can create the need to rebalance the supporting resources in the clusters of serving containers. When changes in the number or resource usage of the serving containers 1115 are implemented, then the routing service 1103 can manage the load balancing and routing of requests according to the changes in the organization of the serving containers.

A routing service 1103 can be implemented as a set of routing containers, or cluster of routing containers, each implementing instances of the routing service 1103 functions or subsets of these functions. The routing service 1103 can authenticate any request from any tenant, and then route the request for service by ML models to any serving container 1115 in a cluster of serving containers.

The ML serving infrastructure 1100 receives requests from tenants via a machine-learning service (MLS) gateway 1101 or a similar interface. The MLS gateway 1101 or similar interface receives a request from a tenant application and identifies a version or instance of an ML model associated with the request. The MLS gateway 1101 or similar interface identifies model information associated with ML models corresponding to a cluster of available serving containers associated with the version of the ML model. The MLS gateway 1101 uses the model information to select a serving container from the cluster of available serving containers. If the ML model is not loaded in the serving container, the ML serving infrastructure 1100 loads the ML model in the serving container. If the ML model is loaded in the serving container, the system executes, in the serving container (e.g., 1105A-C), the ML model (e.g., the scoring models 1133) on behalf of the request. The ML serving infrastructure 1100 responds to the request based on executing the appropriate ML model on behalf of the request.

In one example, the ML serving infrastructure 1100 receives a request for scoring a business opportunity from a Customer Relationship Management (CRM) application or similar application and processing the request requires executing a version of a particular opportunity scoring ML model. The routing service 1103 identifies ML model information including memory and CPU requirements for the scoring ML models in the cluster of scoring serving containers. The routings service 1103 applies a load balancing algorithm, resource management algorithm (e.g., a multi-dimensional bin-packing algorithm) to the collected model information to select the serving container 1115 that has the best combination of available resources to execute a copy of the specific ML model associated with an incoming request.

If a copy of the specific ML model needed to service the incoming request is not already loaded in a serving container 115, then an existing or new serving container loads the required ML model. When a copy of the specific ML model is verified to be loaded in the serving container, then the specific ML model executes the requested service or function, as specified in the received request, in the serving container. A score or similar prediction is thereby generated by the ML model (e.g., a recommendation model) and the ML serving infrastructure 1100 can then respond to the request with the generated score via the MLS gateway 1101.

The ML serving infrastructure 1100 can be implemented in a cloud computing environment in which data, applications, services, and other resources are stored and delivered through shared data centers. The ML serving infrastructure 1100 can be implemented via any other type of distributed computer network environment in which a set of servers control the storage and distribution of resources and services for different client users.

The clusters of the example implementation of the ML serving infrastructure 1100 can be two of any number of clusters that are serving containers for scoring services. Where a scoring service can be a serving container for any number of ML models that perform scoring, i.e., scoring models. Each cluster can execute different sets of scoring services (e.g., different serving containers) for executing different varieties of ML models (e.g., scoring models). The variation of clusters can correlate with serving different ML frameworks such that a given cluster provides a specific ML framework. Thus, each cluster can correlate with a particular ML framework (e.g., AutoML or similar frameworks). Similarly, each specific ML framework can have a version such that each cluster can offer a specific version of an ML framework. Multiple clusters can offer the same version of an ML framework where there is high usage or demand for that framework as there can be a limit on the number of models per cluster or container and similar load balancing concerns. An incoming request can be serviced by a single ML model of a single cluster (e.g., a scoring model of a given scoring service) or the incoming request can be sub-divided to be serviced by multiple clusters, service containers, and ML models. In some implementations, the clusters and serving containers operate other similar types of ML models other than scoring ML models such as ranking and recommendation models. Scoring is provided as an example rather than by limitation. The clusters can be included in some implementations of ranking services and recommendation services, which support ranking models, and recommendation models, respectively. In the illustrated example, the scoring service 1133 is an example of a scoring container that executes a set of scoring models 1133, the ERB cluster 1105C provides a recommendation service 1151 container that can implement recommendation models 1153 or other functions, and other functions can be supported in other container types (e.g., cc cluster 1105B provides ranking service 1141 container that service ranking models 1143).

In some implementations, the routing service 1103 can split the incoming request into separate sub-requests, and then route the sub-requests to their corresponding clusters of serving containers. Although these examples describe the clusters 1115 of serving containers that serve one version of the scoring type of ML models, one version of the recommending type of ML models, and one version of the ranking type of machine-learning models, any clusters of any serving containers may serve any number of versions of any number of any types of any ML models and all permutations thereof.

In some implementations, each of the serving containers 1115 is inspected for service related metadata when loaded or in response to changes to the serving containers 1115 by service discovery and configuration system 1111. The service discovery and configuration system 1111 can reduce load times by avoiding an explicit registration system for the serving containers 1115. The service discovery and configuration system 1111 provides the serving container's registration information, such as the host, the port, functions, or similar information. When any of the serving containers 1115 is no longer available or becomes unavailable, the discovery and configuration system 1111 deletes the unavailable serving container's registration information. An available serving container 1115 can be referred to as an actual serving container. In other embodiments, a registration process is not required and the service discovery and configuration system 1111 can monitor the loading of containers and models to collect the characteristics of each that enable proper routing of requests to these containers and models.

The service discovery and configuration system 1111 can be implemented by HashiCorp Consul, Apache Zookeeper, Cloud Native Computing Foundation etcd, Netflix eureka, or any similar tool that provides service discovery and/or a service registration system. The discovery and configuration system 1111 can track container information about each serving container and model information about each serving container's machine-learning models. In other implementations, this information can be stored in other locations such as datastore using a format or organization. Container information can be data about an isolated execution environment, which executes the main functionality of an ML model. ML model information can be data about the algorithms and/or statistical models that perform a specific task effectively by relying on patterns and inference instead of using explicit instructions.

The routing service 1103 can be deployed with multiple redundant and/or distributed instances so that it is not a single point of failure for the ML serving infrastructure 1100. In some implementations, one instance of the routing service 1103 acts as a master, while other instances of the routing service 103 are in a hot standby mode, ready to take over if the master instance of the routing service fails, or perform some operations at the direction of the master instance.

A data model information in the service discovery and configuration system 1111 provides information about which serving containers 1115 are expected to host-specific ML models (e.g., specific version) and which serving containers actually host the specified ML models. The serving containers 1115 can coordinate with the service discovery and configuration system 111 to track the actual models being hosted at each container using a model mapping structure in the discovery and configuration system 1111. Each of the serving containers 1115 can manage a list of executing ML models. If the serving container list does not match the list of expected ML models that a serving container receives, the serving container can load or delete any ML models as needed, and then update its list of executing ML models accordingly.

Every time an ML model is loaded, the discovery service and configuration system can detect and collect information about the ML model including version information in the data model information or the data model information is similarly updated. Therefore, the routing service 1103 can route requests for a particular ML model to the serving containers.

When any of the executing serving containers 1115 in any of the executing clusters of serving containers dies unexpectedly, or gracefully, the serving container's heartbeat to the service discovery and configuration system 1111 fails. The ML serving infrastructure 1100 removes the data for the failed serving container from its directory, files, or similar data structures in the service discovery and configuration system 1111.

When requests are received by the routing service 1103 via the MLS gateway 1101, a check of the mapping is made to determine if a requested ML model is executing using the service discovery and configuration system 1111. If found, then the routing service 1103 can forward the requests (or divide the request into a set of sub-requests) to the identified serving containers 1115. If a ML model for the request is not found, then the ML model can be loaded from a datastore, specialized database, or store (e.g., a simple storage service (S3)), or similar location into a selected cluster and serving container.

In some implementations, the ML serving infrastructure 1100 can include any number of additional supporting features and functions. These additional supporting features and functions can include application services 1161, version management services (VMS) 1163, redistribution services, and similar functions and services. The application services can be any number, combination, and variety of functions and services for supporting tenant applications and the ML serving infrastructure 1100. The VMS can be any number, combination, and variety of functions and services for supporting different versions of ML frameworks, ML models, and similar components of the machine-learning serving infrastructure 1100. The redistribution services can be any number, combination, and variety of interconnecting services to enable communication between the components of the ML serving infrastructure 1100 and supporting components. In some example implementations, serving containers can interface with or support metrics bus clients, databus clients, and similar components. The metrics bus clients can be services that gather or monitor metrics of the serving containers 1115 and similar aspects of the ML serving infrastructure 1100. Similarly, the databus clients can be services and functions that enable data communication and access between the serving containers 1115 and other components of the ML serving infrastructure 1100.

Example Electronic Devices and Environments

Electronic Device and Machine-Readable Media

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 12A:
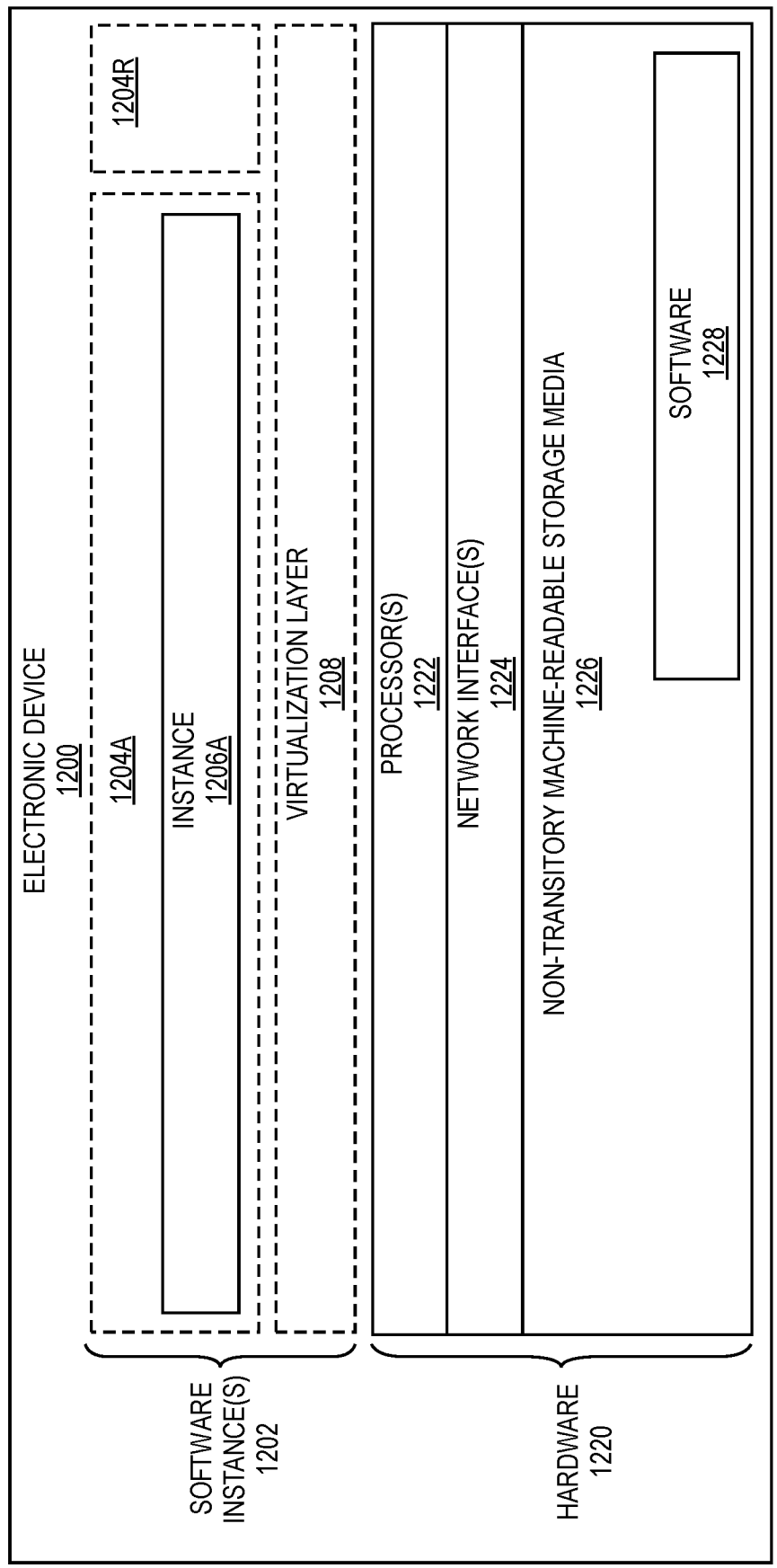
FIG. 12A is a block diagram illustrating an electronic device according to some example implementations.

FIG. 12A is a block diagram illustrating an electronic device 1200 according to some example implementations. FIG. 12A includes hardware 1220 comprising a set of one or more processor(s) 1222, a set of one or more network interfaces 1224 (wireless and/or wired), and machine-readable media 1226 having stored therein software 1228 (which includes instructions executable by the set of one or more processor(s) 1222). The machine-readable media 1226 may include non-transitory and/or transitory machine-readable media. Each of the previously described clients and the ML service including a recommendation system may be implemented in one or more electronic devices 1200. In one implementation: 1) each of the clients is implemented in a separate one of the electronic devices 1200 (e.g., in end user devices where the software 1228 represents the software to implement clients to interface directly and/or indirectly with the XYZ service (e.g., software 1228 represents a web browser, a native client, a portal, a command-line interface, and/or an application programming interface (API) based upon protocols such as Simple Object Access Protocol (SOAP), Representational State Transfer (REST), etc.)); 2) the XYZ service is implemented in a separate set of one or more of the electronic devices 1200 (e.g., a set of one or more server devices where the software 1228 represents the software to implement the ML service); and 3) in operation, the electronic devices implementing the clients and the ML service would be communicatively coupled (e.g., by a network) and would establish between them (or through one or more other layers and/or or other services) connections for submitting requests to the ML service and returning recommendations to the clients. Other configurations of electronic devices may be used in other implementations (e.g., an implementation in which the client and the ML service are implemented on a single one of electronic device 1200).

During operation, an instance of the software 1228 (illustrated as instance 1206 and referred to as a software instance; and in the more specific case of an application, as an application instance) is executed. In electronic devices that use compute virtualization, the set of one or more processor(s) 1222 typically execute software to instantiate a virtualization layer 1208 and one or more software container(s) 1204A-1204R (e.g., with operating system-level virtualization, the virtualization layer 1208 may represent a container engine (such as Docker Engine by Docker, Inc. or rkt in Container Linux by Red Hat, Inc.) running on top of (or integrated into) an operating system, and it allows for the creation of multiple software containers 1204A-1204R (representing separate user space instances and also called virtualization engines, virtual private servers, or jails) that may each be used to execute a set of one or more applications; with full virtualization, the virtualization layer 1208 represents a hypervisor (sometimes referred to as a virtual machine monitor (VMM)) or a hypervisor executing on top of a host operating system, and the software containers 1204A-1204R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 1228 is executed within the software container 1204A on the virtualization layer 1208. In electronic devices where compute virtualization is not used, the instance 1206 on top of a host operating system is executed on the "bare metal" electronic device 1200. The instantiation of the instance 1206, as well as the virtualization layer 1208 and software containers 1204A-1204R if implemented, are collectively referred to as software instance(s) 1202.

Alternative implementations of an electronic device may have numerous variations from that described above. For example, customized hardware and/or accelerators might also be used in an electronic device.

Example Environment

Figure 12B:
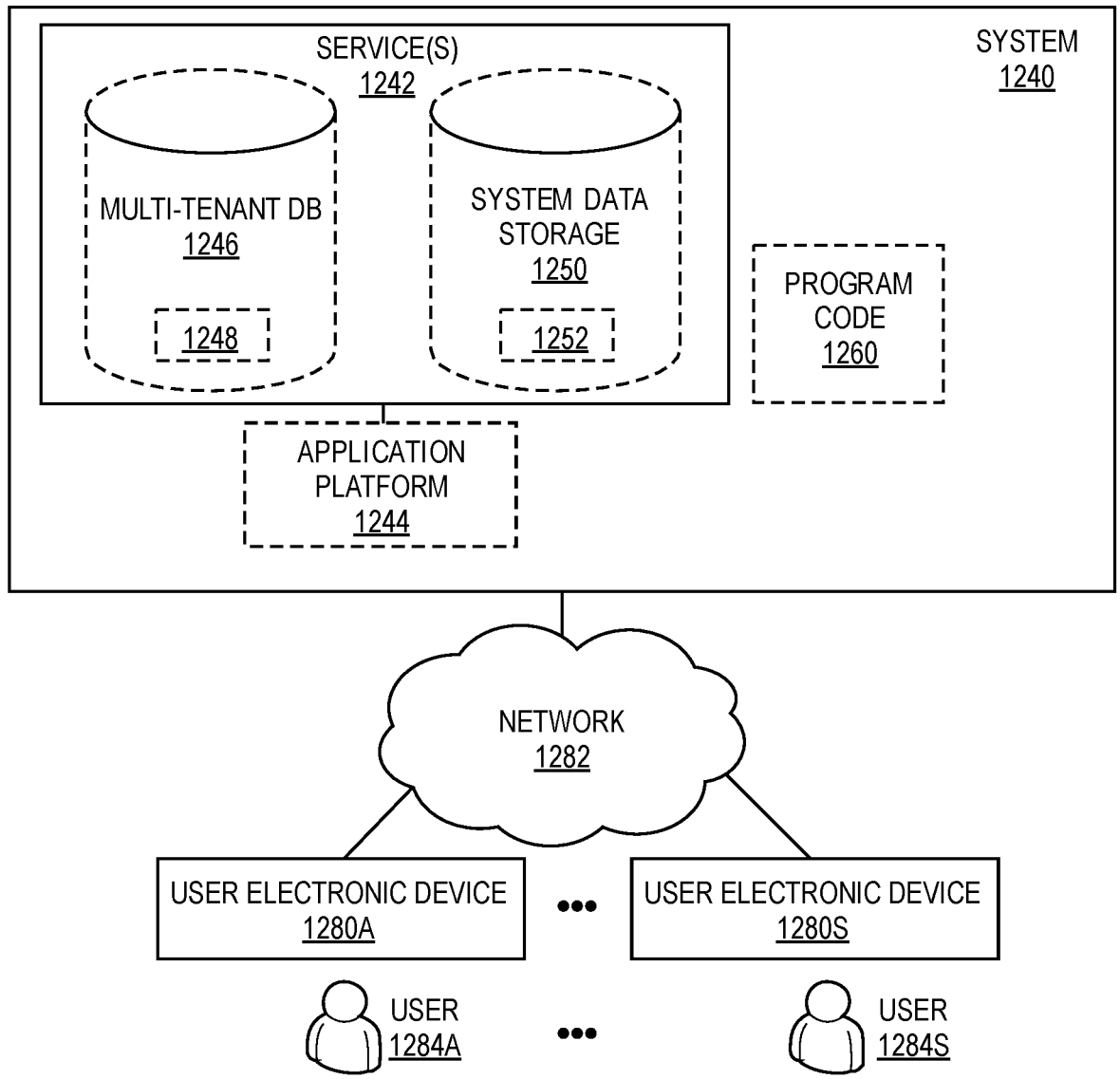
FIG. 12B is a block diagram of a deployment environment according to some example implementations.

FIG. 12B is a block diagram of a deployment environment according to some example implementations. A system 1240 includes hardware (e.g., a set of one or more server devices) and software to provide service(s) 1242, including the ML service. In some implementations the system 1240 is in one or more datacenter(s). These datacenter(s) may be: 1) first party datacenter(s), which are datacenter(s) owned and/or operated by the same entity that provides and/or operates some or all of the software that provides the service(s) 1242; and/or 2) third-party datacenter(s), which are datacenter(s) owned and/or operated by one or more different entities than the entity that provides the service(s) 1242 (e.g., the different entities may host some or all of the software provided and/or operated by the entity that provides the service(s) 1242). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 1240 is coupled to user devices 1280A-1280S over a network 1282. The service(s) 1242 may be on-demand services that are made available to one or more of the users 1284A-1284S working for one or more entities other than the entity which owns and/or operates the on-demand services (those users sometimes referred to as outside users) so that those entities need not be concerned with building and/or maintaining a system, but instead may make use of the service(s) 1242 when needed (e.g., when needed by the users 1284A-1284S). The service(s) 1242 may communicate with each other and/or with one or more of the user devices 1280A-1280S via one or more APIs (e.g., a REST API). In some implementations, the user devices 1280A-1280S are operated by users 1284A-1284S, and each may be operated as a client device and/or a server device. In some implementations, one or more of the user devices 1280A-1280S are separate ones of the electronic device 1200 or include one or more features of the electronic device 1200.

In some implementations, the system 1240 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 1240 is a multi-tenant cloud computing architecture supporting multiple services, such as one or more of the following types of services: Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM).

For example, system 1240 may include an application platform 1244 that enables PAAS for creating, managing, and executing one or more applications developed by the provider of the application platform 1244, users accessing the system 1240 via one or more of user devices 1280A-1280S, or third-party application developers accessing the system 1240 via one or more of user devices 1280A-1280S.

In some implementations, one or more of the service(s) 1242 may use one or more multi-tenant databases 1246, as well as system data storage 1250 for system data 1252 accessible to system 1240. In certain implementations, the system 1240 includes a set of one or more servers that are running on server electronic devices and that are configured to handle requests for any authorized user associated with any tenant (there is no server affinity for a user and/or tenant to a specific server). The user devices 1280A-1280S communicate with the server(s) of system 1240 to request and update tenant-level data and system-level data hosted by system 1240, and in response the system 1240 (e.g., one or more servers in system 1240) automatically may generate one or more Structured Query Language (SQL) statements (e.g., one or more SQL queries) that are designed to access the desired information from the multi-tenant database(s) 1246 and/or system data storage 1250.

In some implementations, the service(s) 1242 are implemented using virtual applications dynamically created at run time responsive to queries from the user devices 1280A-1280S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 1260 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 1244 includes an application setup mechanism that supports application developers' creation and management of applications, which may be saved as metadata by save routines. Invocations to such applications, including the ML service, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 1282 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 1240 and the user devices 1280A-1280S.

Each user device 1280A-1280S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 1240. For example, the user interface device can be used to access data and applications hosted by system 1240, and to perform searches on stored data, and otherwise allow one or more of users 1284A-1284S to interact with various GUI pages that may be presented to the one or more of users 1284A-1284S. User devices 1280A-1280S might communicate with system 1240 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 1280A-1280S might include an HTTP client, commonly referred to as a "browser," for sending and receiving HTTP messages to and from server(s) of system 1240, thus allowing users 1284A-1284S of the user devices 1280A-1280S to access, process and view information, pages and applications available to it from system 1240 over network 1282.

CONCLUSION

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A method for generating a model for recommendations from an item data set for a target data set, the method comprising:
    embedding vectorized target data, representative of targets from the target data set, in a latent space using a first embedding function;
    embedding a vectorized first set of item data, representative of a first set of items from the item data set, in the latent space using a second embedding function;
    selecting at least one target data in the latent space;
    identifying, based on proximity to the at least one selected target data in the latent space, a second set of items from the first set of items as candidates for recommendation;
    scoring each item in the second set of items using a first scoring mechanism;
    ranking each item according to a score for each item;
    computing relevance metrics of each ranked item from the second set of items; and
    comparing the relevance metrics with a baseline model.

2. The method of claim 1, further comprising:
    converting the target data set into a first set of numerical vectors;
    converting the item data set into a second set of numerical vectors; and
    performing negative sampling to identify negative interactions with the item data set.

3. The method of claim 1, wherein the second set of items are identified as a pre-defined number of nearest neighbors to the at least one selected target in the latent space.

4. The method of claim 1, further comprising:
    adding items to the second set of items identified using a set of additional candidate models.

5. A non-transitory machine-readable storage medium that provides instructions that, if executed by a set of one or more processors, are configurable to cause the set of one or more processors to perform operations of a method for generating a model for recommendations from an item data set for a target data set, the operations comprising:
- embedding vectorized target data, representative of targets from the target data set, in a latent space using a first embedding function;
- embedding a vectorized first set of item data, representative of a first set of items from the item data set, in the latent space using a second embedding function;
- selecting at least one target data in the latent space;
- identifying, based on proximity to the at least one selected target data in the latent space, a second set of items from the first set of items as candidates for recommendation;
- scoring each item in the second set of items using a first scoring mechanism;
- ranking each item according to a score for each item;
- computing relevance metrics of each ranked item from the second set of items; and
- comparing the relevance metrics with a baseline model.

6. The non-transitory machine-readable storage medium of claim 5, the operations further comprising:
- converting the target data set into a first set of numerical vectors;
- converting the item data set into a second set of numerical vectors; and
- performing negative sampling to identify negative interactions with the item data set.

7. The non-transitory machine-readable storage medium of claim 5, wherein the second set of items are identified as a pre-defined number of nearest neighbors to the at least one selected target in the latent space.

8. The non-transitory machine-readable storage medium of claim 5, the operations further comprising:
- adding items to the second set of items identified using a set of additional candidate models.

9. An apparatus comprising:
a set of one or more processors; and
a non-transitory machine-readable storage medium that provides instructions that, if executed by the set of one or more processors, are configurable to cause the apparatus to perform operations of a method for generating a model for recommendations from an item data set for a target data set, the operations comprising,
- embedding vectorized target data, representative of targets from the target data set, in a latent space using a first embedding function,
- embedding a vectorized first set of item data, representative of a first set of items from the item data set, in the latent space using a second embedding function,
- selecting at least one target data in the latent space,
- identifying, based on proximity to the at least one selected target data in the latent space, a second set of items from the first set of items as candidates for recommendation,
- scoring each item in the second set of items using a first scoring mechanism,
- ranking each item according to a score for each item,
- computing relevance metrics of each ranked item from the second set of items, and
- comparing the relevance metrics with a baseline model.

10. The apparatus of claim 9, wherein the operations further comprise,
- converting the target data set into a first set of numerical vectors;
- converting the item data set into a second set of numerical vectors; and
- performing negative sampling to identify negative interactions with the item data set.

11. The apparatus of claim 9, wherein the second set of items are identified as a pre-defined number of nearest neighbors to the at least one selected target in the latent space.

12. The apparatus of claim 9, wherein the operations further comprise,
- adding items to the second set of items identified using a set of additional candidate models.

* * * * *